United States Patent [19]

Butler

[11] 4,163,561
[45] Aug. 7, 1979

[54] FATIGUE RESISTANT FITTINGS AND METHODS OF FABRICATION

[75] Inventor: Albert Q. Butler, Odessa, Tex.

[73] Assignee: Dart Industries Inc., Los Angeles, Calif.

[21] Appl. No.: 934,227

[22] Filed: Aug. 15, 1978

[51] Int. Cl.² .......................... B23P 11/02; F16J 15/08
[52] U.S. Cl. .......................................... 277/9; 277/1;
277/236; 285/381; 137/318; 138/140; 29/447;
29/157 T
[58] Field of Search .................. 277/1, 9, 237 R, 234,
277/235 R, 236; 138/140, 147; 285/381;
137/318; 29/447, 157 T

[56] References Cited

U.S. PATENT DOCUMENTS

| | | | |
|---|---|---|---|
| 714,903 | 12/1902 | Hinds | 138/140 X |
| 2,386,747 | 10/1945 | Ris | 138/140 X |
| 2,608,989 | 9/1952 | McDonald | 137/318 |
| 3,734,112 | 5/1973 | Finney et al. | 137/318 X |
| 4,008,049 | 2/1977 | Clemmer et al. | 307/310 X |

FOREIGN PATENT DOCUMENTS

| | | | |
|---|---|---|---|
| 1341773 | 9/1963 | France | 137/318 |
| 1166777 | 10/1969 | United Kingdom | 285/381 |
| 1518788 | 7/1978 | United Kingdom | 285/381 |

Primary Examiner—Robert S. Ward, Jr.
Attorney, Agent, or Firm—Margareta LeMaire; Bryant W. Brennan

[57] ABSTRACT

A novel, fatigue resistant fitting of the joint ring type used between bolted, flanged sections of high pressure tubing is provided which safely and durably serves the dual functions of high pressure joint sealing and convenient instrumentation tap access. The fitting comprises two concentric, thick-walled cylindrical shells with the outer shell shrink-fitted onto the inner shell which is free of threaded portions or other stress concentration points except for one or two radial bores at about its midlength, and in axial alignment with each of said radial bores, a cleanly threaded aperture of substantially larger diameter through said outer shell. For maximum fatigue resistance under difficult service, the compound shell fitting is also subjected to an autofrettage treatment.

14 Claims, 9 Drawing Figures

FIG./
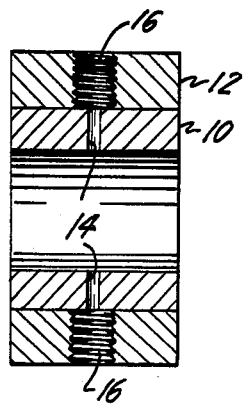
FIG.2
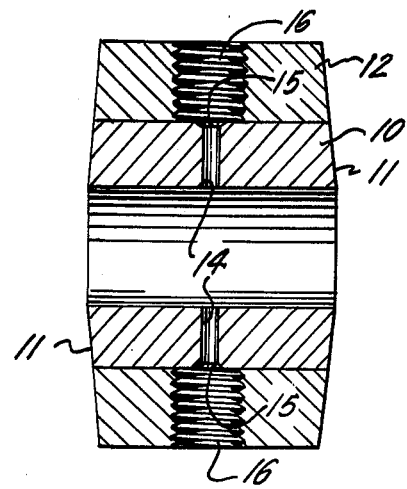
FIG.3
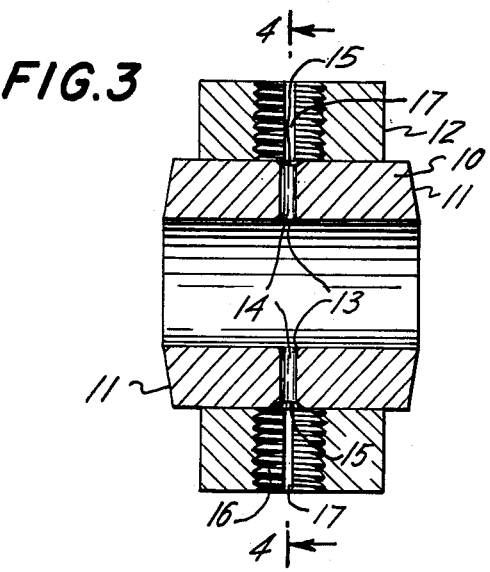
FIG.4
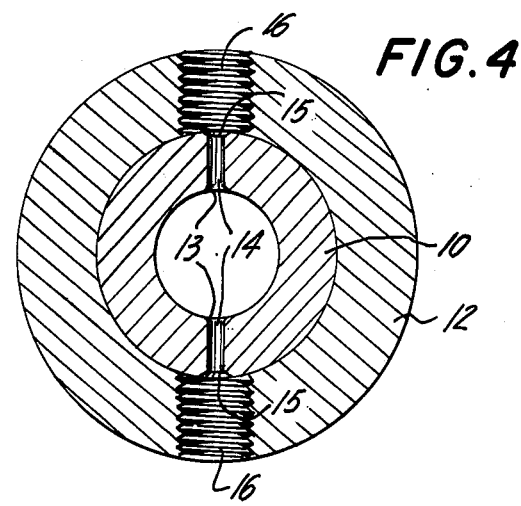
FIG.5
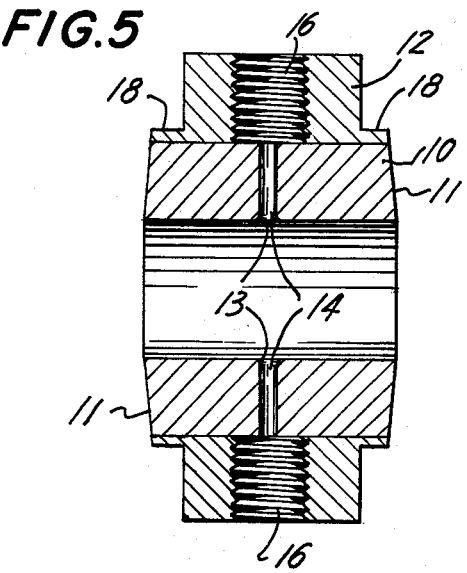
FIG.6
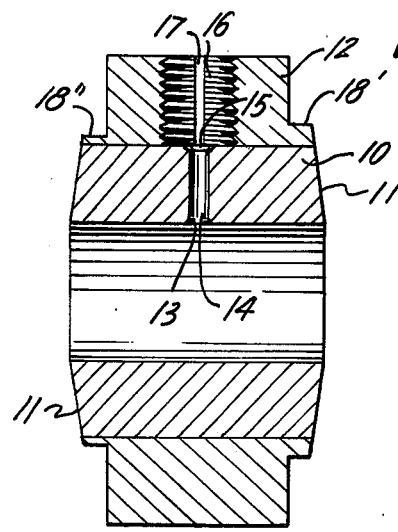

FATIGUE RESISTANT FITTINGS AND METHODS OF FABRICATION

INTRODUCTION

This invention relates to relatively compact high-pressure fittings with excellent fatigue resistance and particularly to a unitary fitting of compound shell design which functions as both an instrumentation tap and a joint seal ring between flanged sections of high pressure tubing or piping. The present invention also embraces special fabrication techniques which tend to maximize the fatigue resistance of the subject fittings and help to control their production costs.

BACKGROUND OF THE INVENTION

Fatigue failure in high pressure equipment is a common problem which becomes especially notorious when frequent pressure fluctuations are encountered. One exemplary commercial field where extensive cyclic pressure fluctuations are prevalent is the high pressure polymerization of ethylene.

The most common form of equipment used for high pressure ethylene polymerization is the tubular reactor which consists of long sections of heavy walled tubing interconnected in series. In order to permit intermediate entry and lateral access to the reaction zone at points along its length without damage to said heavy wall tubing, it has been conventional practice to provide between the flanged ends of adjacent sections of tubing rather massive connection blocks, such as block 38, illustrated in FIG. 2 of U.S. Pat. No. 4,008,049. Because of the stress concentration effects arising from the thermocouple access ports or the like drilled through the side wall thereof, these prior art connection blocks had to be constructed with exceptionally thick walls in order to prevent fatigue cracks from developing therein during service.

SUMMARY OF THE INVENTION

The object of this invention is to provide an improved high pressure fitting combining the functions of instrumentation tap and connection sealing device for the joint between flanged tubing sections. A related object is to provide such fittings having excellent fatigue resistance without the burden of excessive weight and size.

Another object is to provide efficient methods for fabricating such fittings which maximize uniformity and reduce defects and waste. Still other objects and advantages will become apparent from the full description of the invention which follows.

In accordance with the present invention, improved fatigue resistant fittings of the subject type are characterized by a compound shell structure involving two concentric thick-walled cylindrical shells having an interference fit relationship wherein the outer shell is shrink-fitted onto the inner shell, said inner shell being free of threaded portions or other stress concentration points except for one or two radial bores at about the midlength thereof, said bores being suitable for lateral entry ports, insertion of thermocouple probes, etc. Contiguous with each such radial bore and concentrically aligned therewith, a cleanly threaded radial aperture is provided through said outer shell for the attachment of lateral holding or connection means the diameter of said threaded aperture being substantially larger than that of said radial bore contiguous therewith but only a minor fraction i.e. substantially less than ½ of the length of said outer shell.

In the preferred method for fabrication of the subject fittings, the threaded radial aperture(s) called for in the outer shell are bored and tapped completely before the shrink-fitting of said outer shell onto the inner shell and thereafter a radial bore of smaller diameter is drilled in said inner shell contiguous to and in axial alignment with each threaded radial aperture. Still further enhancements of the fatigue resistance of the resultant shrink-fitted dual shell assembly can be attained by subjecting same to internal, autofrettage pressure treatments.

DETAILED DESCRIPTION

A full understanding of the present invention and the detailed constructions involved in concrete embodiments thereof can be obtained from the following description in conjunction with the accompanying drawings wherein:

FIG. 1 is a sectional view along its axis of a basic fitting constructed in accordance with this invention to provide two lateral access taps.

FIG. 2 is a comparable view of a similar fitting provided with specially shaped sealing surfaces at either end and at the lateral access taps.

FIG. 3 is a comparable view of a fitting corresponding essentially to the construction shown in FIG. 2 except that the inner shell extends beyond the outer shell at either end.

FIG. 4 is a sectional view of the fitting of FIG. 3 along line 4—4 of FIG. 3.

FIG. 5 is a sectional view along its axis of a fitting having approximately the same final conformation as the fitting depicted in FIGS. 3 and 4 but produced by removing a major outer portion of the outer shell for a short distance at either end.

FIG. 6 is a comparable view of a fitting of the same general character as the fitting depicted in FIG. 5 except that only one lateral access tap is provided therein and the reduced thickness of the outer shell at one end is greater than that at the other.

Figure 7:
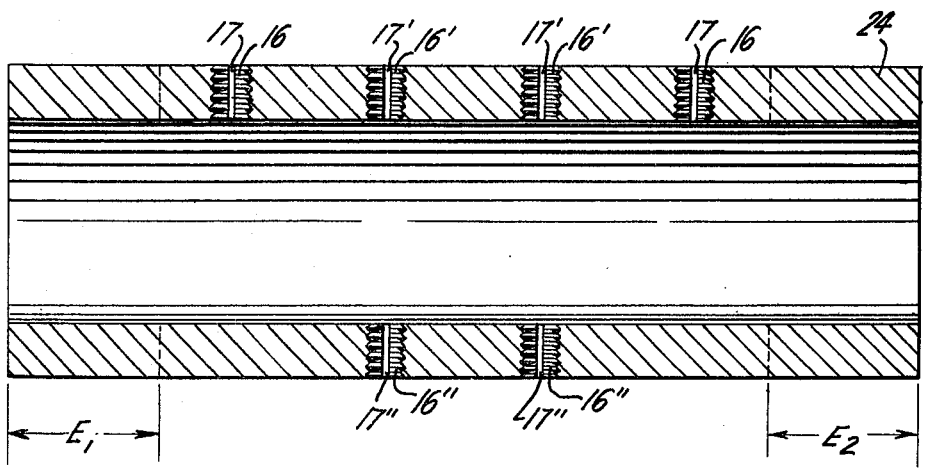
FIG. 7 is a sectional view along its axis of a thick-walled cylinder having a length sufficient to be subdivided into several individual fittings of the subject class and showing an exemplary pattern of threaded radial apertures suitably located therein to serve as access taps in the finished fittings.

Referring now to FIG. 1, there is depicted the basic compound cylinder construction of a simple fitting having two lateral access taps. This fitting consists of outer thick-walled cylinder 12 concentrically shrink fitted onto inner thick-walled cylinder 10. Although the term "thick-walled" cylinder generally connotes cylinders having wall thicknesses greater than about 10% of their inside diameter, it is preferred in the present invention to use cylinders having outside diameters at least 40% greater than their inside diameters. Said inner cylinder 10 is free of threaded portions and other stress concentration points except for radial bores 14. Contiguous to and axially aligned with said bores 14, a cleanly threaded apertures 16 of substantially larger diameter are provided through outer shell 12 for use in attaching access fittings or instrumentation devices and holding them in sealing contact with inner cylinder 10.

The fitting shown in FIG. 2 is of substantially the same general construction and consists of the same basic arrangement of elements identified by the corresponding reference numerals already employed in FIG. 1. However, slight shape modifications have been made to provide more positive sealing at each end of the fitting and at each lateral access tap. Thus, a shallow wide-angle (i.e. over 100°) conical seat 15 (preferably totalling between 120° and 150°) is formed in the outer periphery of inner cylinder 10 concentric with each radial bore 14, and each end 11 of the compound cylindrical body is gently tapered to form a convex frustoconical shape, preferably corresponding to a solid cone angle of between about 120° and about 170°.

Once again in FIGS. 3 and 4, an analogous fitting is depicted involving the same arrangement of basic elements each of which is identified by the same reference numeral as previously applied herein. The principal modification illustrated in this particular fitting is that the thick-walled outer cylinder 12 is not as long as inner cylinder 10, leaving short hub-like extensions of said inner cylinder at either end of the fitting. These extensions are of use as alignment guides in assembling same between flanged high pressure tubing sections being interconnected therethrough. Accordingly, even in combination, they represent only a minor fraction of the total fitting length, e.g. normally no more than about one third. In any case, to insure good stress distribution and fatigue resistance of the resultant compound thick-walled shell fitting, the ratio of the length of thick-walled outer cylinder 12 to diameter of radial bores 14 should always be at least about 6/1 and preferably at least 8/1.

Additional advantageous but optional refinements illustrated by FIGS. 3 and 4 include the gently rounded edges 13 on radial bores 14 at the inner periphery of inner cylinder 10 and the small, isolated escape holes or slots 17 running vertically through the threads of apertures 16 to provide a bleed off route for any minor fluid leakage past seats 15.

FIGS. 5 and 6 depict additional embodiments of fittings analogous to the modification shown in FIGS. 3 and 4. These embodiments illustrate how the outside diameter of the hub-like extensions 18 can be readily varied by reducing the wall thickness of the outer cylinder at either end thereof. As shown in FIG. 6, the outside diameter of the resulting hub extension at one end 18' can thus be made larger than that at the opposite end 18" so as to adapt the fitting for joining tubing sections of different diameters. Also, it will be noted that FIG. 6 illustrates another option, namely the provision of only one lateral access opening rather than two.

The fittings of the present invention will normally be fabricated from high strength metal such as high grade alloy steels and the like. A vital step in the fabrication process is the obtaining of a uniform interference fit between the inner cylinder and the outer cylinder which is shrink-fitted thereto. This in turn requires that the outside of the inner cylinder and the inside of the outer cylinder be truly concentric and smooth with the outside diameter of said inner cylinder being greater at a given temperature than the inside diameter of said outer cylinder by a substantially uniform minor fraction of a percent. For metals of primary interest, the proper differential in said diameters for a sound interference fit will lie in the range of about one-tenth to about three-tenths of a percent since such a differential provides an adequate compressive force between cylinders and yet does not require excessive heating of the outer cylinder to expand it enough to slide the inner cylinder inside of it.

The overall fabrication procedure is greatly simplified by boring and tapping all planned threaded radial apertures through the lateral wall of the outer cylinder before it is shrink-fitted onto said inner cylinder while deferring the drilling of the radial bores and related machining on the lateral walls of said inner cylinder until after the shrink-fitting step is completed. Use of this sequence of operations achieves the desired coaxial relationship between the threaded apertures in the outer cylinder and the contiguous radial bores in the inner cylinder with a minimum of difficulty.

Using high strength alloy steels and following the fabrication procedures outlined above, excellent fatigue resistant fittings have been produced in several sizes having inside diameters in the general range of about 1 to 2 inches. The corresponding outside diameters of the inner cylinders used in such fittings generally is from about 1.5 inches to about 4 inches, indicating a diameter differential of about 2 to about 10 thousandths of an inch in order to obtain the desired interference fit with the outer cylinder. In this connection superior results are obtained when the outer surface of said inner cylinder and the inner surface of said outer cylinder are smoother than the usual machine finish. Accordingly, it is preferred that honing or grinding techniques be used to effect the final adjustments in the dimensions of these surfaces so as to provide them with a finish having a maximum roughness of about 16 microinches.

Although strong, durable fittings with excellent fatigue resistance are obtained by the double shell fabrication techniques already described, further improvements in service life under extreme fatigue conditions of high and sharply fluctuating pressure can often be achieved by subjecting the compound shell fittings to autofrettage treatment, which involves the application of internal pressure sufficient to initiate partial yielding or cold working of the compound wall structure.

When such an autofrettage treatment is to be applied, it has been found advisable to fabricate the fittings from cylinders longer than the desired fitting length so as to provide expendable end portions which can be used to effect the tight seal connections needed for internal application of the autofrettage pressures. These end portions can then be cut away and discarded leaving the autofrettaged fitting proper unscored and free of structural damage or defects.

However, instead of fabricating a single fitting at a time, it is highly advantageous from a cost standpoint to employ in the above outlined procedures thick-walled cylinders of sufficient length to be ultimately subdivided into several individual fittings, and this is particularly true when autofrettage treatment is employed since the loss of construction material in the form of expendable end portions used in making the autofrettaging pressure tight connections is also thereby reduced.

Figure 8:
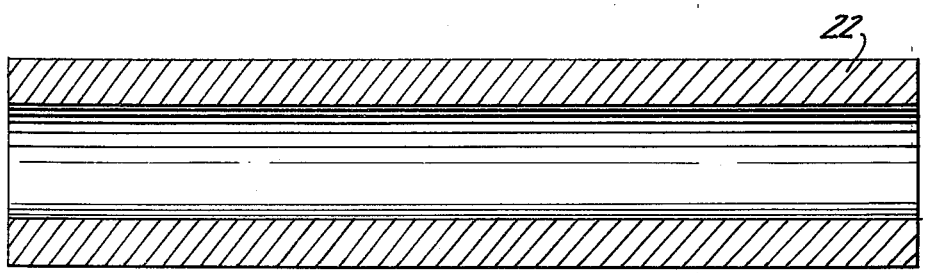
FIG. 8 is a sectional view along its axis of another thick-walled cylinder of substantially the same length as the one shown in FIG. 7 and having an outside diameter just slightly larger than the inside diameter of said cylinder of FIG. 7.
Figure 9:
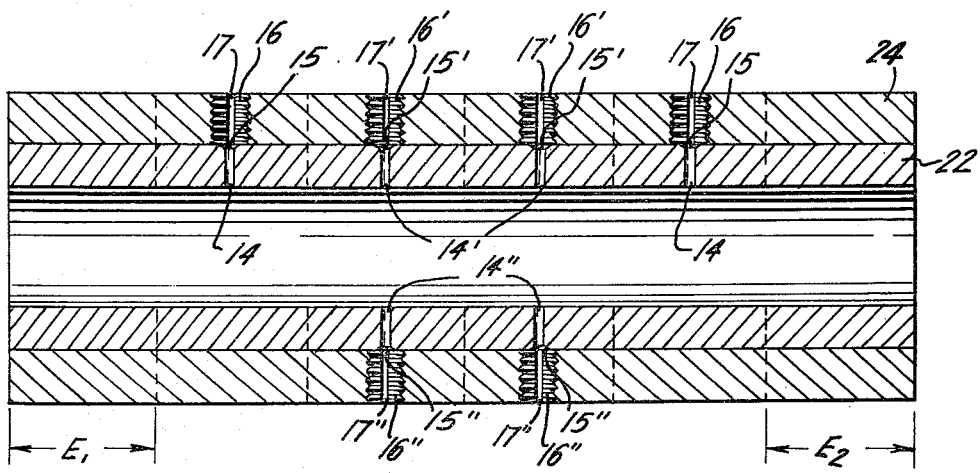
FIG. 9 is a sectional view of the assembly produced by shrink fitting the cylinder of FIG. 7 onto the cylinder of FIG. 8 and cutting small radial bores through the latter in axial alignment with the threaded radial apertures in the cylinder of FIG. 7.

Details of this multi-unit fabrication technique will be better understood by referring to FIGS. 7, 8 and 9 of the drawings. Thus FIG. 7 depicts a thick-walled outer cylinder 24 the length of which exceeds the length of four individual fittings by an amount sufficient to provide expendable end portions indicated by the linear dimensions marked "$E_1$" and "$E_2$".

The central portion of said cylinder 24 has four cleanly threaded radial apertures 16 and 16' through the upper sidewall thereof, evenly spaced from each other with escape holes or slots 17 and 17' running straight along through the line of threads of the respective apertures. Diametrically opposite each of the middle two apertures 16', similar threaded radial aperture 16" are provided in the lower sidewall with associate thread line escape holes or slots 17". Correspondingly, FIG. 8 represents thick-walled inner cylinder 22 to which said thick-walled outer cylinder 24 is to be shrink-fitted. Accordingly, cylinder 22 is of substantially the same length as cylinder 24 and has a uniform outside diameter just a few thousandths of an inch larger than the inside diameter of cylinder 24 when both cylinders are at the same temperature. Also, both the inner surface of cylinder 24 and the outer surface of cylinder 22 have a smooth finish as shown by a roughness measurement not greater than about 16 microinches.

Finally, FIG. 9 depicts the completed assembly obtained by thermally expanding cylinder 24 sufficiently to slide cylinder 22 inside same and then thermally shrinking cylinder 24 to effect a compressive shrink-fit thereof onto cylinder 22, followed by the machining of radial bores 14, 14' and 14" and associated shallow conical seats 15, 15' and 15" in said inner cylinder 22.

If desired, the optional autofrettage treatment is ideally carried out on the completed assembly of FIG. 9, by means of pressure sealing connective attachments applied to expendable sections "$E_1$" and "$E_2$" while the lateral access openings are sealed by means of removable plug blanks held in place by gland nuts screwed into apertures 16, 16' and As the final step of this multi-unit fabrication technique, the assembly shown in FIG. 9 is severed along each of the dotted lines indicated thereon so as to obtain (after discarding expendable end sections $E_1$ and $E_2$) four individual fittings, i.e. two fittings having one lateral access tap and two having two such access taps. The pattern of each fitting is obviously variable at will and the number of individual units per multi-unit assembly is obviously subject to considerable variation also, e.g. from two up to some maximum number determined by the size of the individual units relative to the overall cylinder length which is manageable in the shrink-fitting operations and other fabrication techniques obtained. In the most favored size range, this approach can generally be carried up to an assembly length yielding six individual fittings before undue alignment difficulties are encountered.

Having described my basic invention generally as well as preferred specific embodiments thereof in detail, the principles thereof will now be clearly understood. Accordingly, it is intended that the appended claims apply to all modified and equivalent forms of my invention representing clear equivalents or variations thereof as obvious to those skilled in the art.

What is claimed is:

1. A fatigue resistant instrumentation tap and seal ring device for use in connecting sections of high pressure tubing comprising two concentric, thick-walled cylindrical shells with the outer shell being shrink-fitted onto the inner shell, said inner shell being free of threaded portions and other stress concentration points except for one or two radial bores at about midlength thereof and, axially aligned with each said radial bore, a contiguous, cleanly threaded radial aperture through said outer shell, the diameter of said threaded aperture being substantially larger than that of said radial bore but only a minor fraction of the length of said outer shell.

2. An instrumentation tap and seal ring device as described in claim 1 wherein a shallow conical seat is formed in the outer periphery of said inner shell concentrically around each said radial bore.

3. An instrumentation tap and seal ring device as described in claim 1 wherein the length of said thick-walled outer shell is somewhat less than the length of said inner shell but is at least about 6 times the diameter of the largest radial bore in said inner shell.

4. A device as in claim 3 wherein there are two radial bores in said inner shell and they are located substantially diametrically opposite one another.

5. An instrumentation tap and seal ring device as described in claim 1 wherein the outside diameter of each of said thick-walled cylindrical shells is at least about 40% greater than its inside diameter.

6. A device as in claim 5 wherein each end of said inner shell has a frustoconical shape corresponding to a solid cone angle of between about 120° and about 170°.

7. A device as in claim 6 wherein said thick-walled outer shell is substantially coextensive with the outside of said inner shell.

8. A device as in claim 7 wherein the ends of said outer shell also have a frustoconical shape approximating a continuation of said frustoconical shape of the ends of said inner shell.

9. A device as in claim 6 wherein said thick-walled outer shell is shorter than the outside of said inner shell, leaving a short hub-like extension of reduced outside diameter on either end of said device.

10. A device as in claim 9 wherein said hub-like extensions at either end have substantially differing outside diameters.

11. A method of making a fatigue resistant, compound-cylinder, instrumentation tap and tubing connector fitting comprising the steps of machining either or both of the inner surface of a larger thick-walled cylinder and the outer surface of a smaller thick-walled cylinder to produce substantially uniform diametrical dimensions thereof such that the outer diameter of the smaller cylinder exceeds the inner diameter of the larger cylinder by a fraction of a per cent, completely boring and tapping all planned threaded radial apertures through the lateral wall of said larger cylinder, honing both the inner surface of said larger cylinder and the outer surface of said smaller cylinder to a 16 microinch finish or smoother while retaining an interference fit of about one-tenth to about three-tenths of a per cent between the inside of said larger cylinder and the outside of said inner cylinder, heating said larger cylinder until its inner diameter exceeds the outer diameter of said smaller cylinder, inserting said smaller cylinder into said heated larger cylinder, cooling said larger cylinder so as to shrink fit it onto the outside of said smaller cylinder and then machining in axial alignment with each bored and tapped aperture in said larger cylinder a smaller smooth bore through the wall of said smaller cylinder with a shallow tapered seat surrounding same at the outer periphery thereof.

12. A method as in claim 11 wherein said thick-walled cylinders are sufficiently longer than the length desired for the finished fitting to provide expendable portions at each end which can be used to form temporary pressure tight seals and, after said larger cylinder has been shrink-fitted onto said smaller cylinder and the machining of all wall openings has been completed, an autofrettage treatment of the assembly is effected by applying suitable internal pressures to the inside thereof while temporarily maintaining pressure tight seals at both ends thereof and at all wall openings therein and subsequently cutting off said expendable end portions.

13. A method as described in claim 12 wherein the internal pressure applied during said autofrettage treatment is sufficient to exert inelastic strain and initiate partial yielding or cold working of the compound wall structure.

14. A method as described in claim 12 wherein the length of said cylinders between said expendable end portions is at least twice and preferably several times the length desired for a finished individual fitting so that two or more individual fittings are obtained by removing said expendable end portions and transversely severing the remainder of said assembly at points about half-way between adjacent wall openings.

* * * * *

UNITED STATES PATENT AND TRADEMARK OFFICE
CERTIFICATE OF CORRECTION

PATENT NO. : 4,163,561
DATED : August 7, 1979
INVENTOR(S) : Albert Quincy Butler It is certified that error appears in the above-identified patent and that said Letters Patent are hereby corrected as shown below:

Column 3, line 4     after "14," delete -- a -- .

Column 5, line 38     after "and" add -- 16". -- .

Column 5, lines 51-52     "obtained" should read -- outlined -- .

Signed and Sealed this

Seventeenth Day of November 1981

[SEAL]

*Attest:*

*Attesting Officer*

GERALD J. MOSSINGHOFF

*Commissioner of Patents and Trademarks*